Patented June 6, 1950

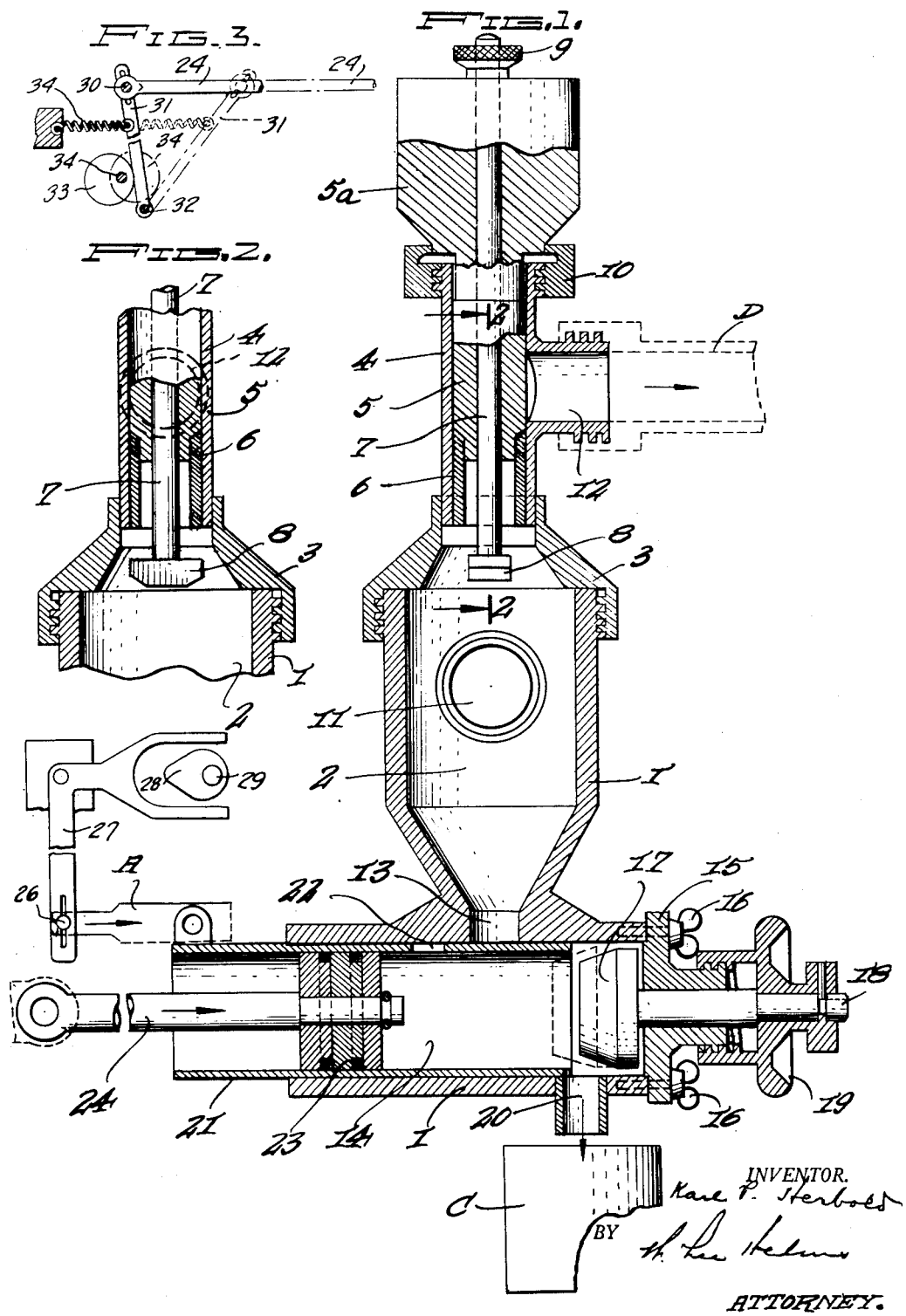

2,510,576

UNITED STATES PATENT OFFICE 2,510,576

MEASURING DISPENSER FOR FILLING ICE-CREAM CONTAINERS AND THE LIKE

Karl P. Herbold, Brooklyn, N. Y., assignor to Eskimo Pie Corporation, Bloomfield, N. J., a corporation of Delaware Application April 5, 1946, Serial No. 659,769

7 Claims. (Cl. 222—383)

The present invention relates to apparatus for dispensing measured quantities of a semi-solid material of varying consistency, and more particularly to a measuring dispenser for ice cream and similar substances.

Measuring dispensers for ice cream and the like are well known in the art. The customary automatic types are equipped with a measuring chamber which is periodically emptied by a displacement piston ejecting its contents into a waiting container. In such prior devices, maintenance of a uniform filling level is rendered difficult or impossible due to the varying density of the mass. In the commercial manufacture of ice cream, air is whipped into the ice cream mix in greater or less proportion according to the particular conditions of freezing. The mix expands in bulk to an extent which changes from time to time. If the ice cream is firm, the action of the piston in the measuring chamber will result in a further increase of its density; whereas if the mass is of light consistency and high overrun, the action of the piston will not materially increase the density of the ice cream since the latter will freely flow through the nozzle. To meet these fluctuations and fill the containers to a substantially uniform height, the known dispensers of this kind are provided with means for adjusting the stroke of the piston. The same adjustment is being used for making changes in the quantity dispensed, e. g. when cups of different capacity are used. The adjustment of the piston stroke is cumbersome and requires suspension of the operation of the machine.

An object of the invention is to provide an apparatus adapted to avoid the above disadvantages; to provide an apparatus for dispensing measured quantities of ice cream or the like substantially equal in volume as well as in density, and hence weight.

Another object is to provide convenient means for manually adjusting the density of the product dispensed by the apparatus.

A further object is to provide convenient means for manually adjusting the volume of the product to be dispensed by the apparatus.

The foregoing and other objects and advantages of the invention will become apparent from the following description of an illustrative embodiment of the invention when considered in connection with the accompanying drawings, in which:

Fig. 1 is an elevational view, in section, of the principal parts of an ice cream dispenser according to the invention.

Fig. 2 is a fragmentary section on line 2—2 of Fig. 1.

Fig. 3 is a schematic view in elevation showing means for reciprocating the piston in timed relation with reciprocation of the sleeve.

The apparatus as shown in the drawing comprises a housing 1 which may be made of metal or any other suitable material; the housing defines a chamber 2 which is partly closed at its top portion by a threaded member or cover 3. A cylinder 4 is tightly fitted in the cover 3 and serves as a guide for a valve 5 weighted down by its own head 5a. A bushing 6 is secured to the lower end of cylinder 4 to serve as a seat for valve 5. The body of valve 5 and its head 5a are pierced by a stem 7 which is threaded at its upper end and bears at its lower end a T-head 8. A knob 9 engages the threaded extremity of stem 7. The nut 10, engaging a threaded section of cylinder 4, serves as a seat for the valve head 5a and permits manual adjustment of the position of the valve 5.

The chamber 2 has an inlet port 11 and opens into an outlet port 12 when the valve 5 is in raised position. The port 12 is formed by a flange of cylinder 4 and may be connected, say, to an overflow duct D leading back to the freezer. The outlet 13 at the throat of chamber 2 leads into a chamber 14 which is formed by the housing 1 and by the cover 15 fastened thereto in any convenient manner, such as by screws 16.

A plunger 17 is secured to a rod 18 projecting through the cover 15. The handwheel 19, fastened to the reduced section of rod 18, also engages a threaded portion of cover 15. A cup or container C may be placed underneath nozzle 20 leading from the chamber 14 into the open.

The chamber 14 further contains a sleeve 21 sliding freely in that chamber under the guide of an external member, for instance, a lever A. In the drawings lever A carries a stud 26 which is received in a slot formed in the lower leg of a forked rock lever member 27, a cam 28 rotated by shaft 29 serving to actuate the rock lever and, through lever 8, reciprocating the sleeve. Sleeve 21 contains an orifice 22 which in its rightmost position registers with the outlet 13 of chamber 2. A piston 23 travels within the sleeve 21 under the impulse of a piston rod 24 which, in turn, may be actuated by any suitable power driven member. In Fig. 3 the outer end of the piston rod 24 carries a stud 30 entering the slotted end of a lever 31, the latter being pivoted at 32. An eccentric 33 on shaft 34 imparts positive movements to the piston rod and piston, return of these elements being effected by a spring 34.

The operation of the apparatus is as follows: Fresh ice cream from a supply tank (not shown) enters the chamber 2 through the inlet port 11 under a mean pressure of, say, 15 pounds per square inch. If the mix is sufficiently dense, the continuous flow under pressure will lift the weighted valve 5 and cause some of the ice cream to return to the freezer via outlet 12. If, however, the flow is light or discontinuous, a further slight compression will take place in the chamber 2 as or before the ice cream is forced through small outlet 13 and orifice 22 into the measuring chamber 14. Assume that the sleeve 21 is at this moment in its rightmost position, i. e. admitting ice cream into the chamber 14 while barring its outflow through the nozzle 20. As an empty cup C comes to rest underneath nozzle 20, the sleeve 21 is quickly retracted due to the reverse motion of the connecting lever A, thus shutting off chamber 2 from the measuring chamber 14 and opening nozzle 20. Thereupon piston 23 will be moved forward by piston rod 24, ejecting the measured quantity of ice cream through the nozzle into the cup. The adjustable plunger 17, operated by the handwheel 19, can be used to reduce the capacity of the chamber 14 while simultaneously restricting the throttle area of the nozzle 20. This has been shown by a broken line in Fig. 1. The nut 10 permits manual adjustment of the position of the weighted valve 5, which, however, has its lift limited by the T-head 8 of the valve stem 7; in its top position the T-head 8 will abut against the bushing 6 without shutting off the flow through the valve. Adjustment of the lift is possible by means of the knob 9 engaging the threaded end of valve stem 7.

The handwheel 19, nut 10, and knob 9 enable the operator to control in convenient manner the flow of ice cream without interfering with the piston 23. The weighted valve 5, operated in the manner described, tends to maintain substantially constant the density of the contents of chamber 2. This density may be varied with the aid of adjusting nut 10. Knob 9 may be used to limit the range of automatic control or even to immobilize the valve in a desired position. It is generally advisable to adjust these controls so as to provide a constant opening when the ice cream is "heavy" or of major density, valve 5 being closed when the ice cream is light, i. e. has abundant overrun.

If it is desired to reduce the capacity of the measuring chamber, as for the purpose of filling a series of containers of smaller capacity, this can be readily accomplished by means of plunger 17 and handwheel 19. At the same time, the density of the ice cream will be increased due to restriction of the nozzle 20. If this be undesirable, the mass can be restored to its original density, or any other consistency, by adjustment of nut 10, since a raising of the valve body 5 permits greater overflow and reduces the pressure in chamber 2. In this manner both the weight and the volume of the mix can be controlled and maintained at any value desired.

While the invention is of particular usefulness in the manufacture and distribution of ice cream, it will be understood that the apparatus may be employed for dispensing other substances; also that numerous modifications adapting it for other uses are possible without departing from the scope of the invention as defined in the appended claims.

What is claimed is:

1. In an apparatus for dispensing a measured quantity of a substance of varying density in combination, a measuring chamber, a receiving chamber, said measuring chamber provided with a discharging nozzle, a plunger controlling the effective volume of the measuring chamber and simultaneously changing the cross-sectional area of the outlet of the discharge nozzle, means for adjusting said plunger, a reciprocating sleeve slidably arranged within the said measuring chamber, said reciprocating sleeve having an inlet port positioned for registration, with the outlet port, leading from the said receiving chamber towards the said measuring chamber, said sleeve dimensioned so as to close the nozzle of the said measuring chamber when its inlet port registers with the said outlet port, a piston arranged within the said sleeve adapted to expel a measured quantity of the substance, means for reciprocating said piston and means for reciprocating said sleeve, concurrently with the said piston, said sleeve being retracted prior to initiating the dispensing stroke of said piston, a duct supplying the substance from the supply tank to the said receiving chamber, an overflow duct connecting the receiving chamber, with the said supply tank, and a weighted control valve inserted within the said overflow duct, said valve being manually adjustable, having a vertical stem, piercing the valve body, a T-shaped head being secured to the lower end of the stem and a manually rotatable knob being secured to the threaded upper end of said stem.

2. In an apparatus for dispensing measured quantities of substances of varying density, in combination, a chamber, said chamber being provided with an outlet, displacement means slidably arranged within the said chamber, feeding means for filling said chamber, return means for removing overflow substance from the said chamber, said return means being adjustably controlled, and a loaded control valve operative associated with said return means.

3. In an apparatus for dispensing measured quantities of substances of varying density, in combination, a measuring chamber, adjusting means for changing the effective volume of said chamber, a piston slidably arranged within that measuring chamber, a receiving chamber intermittently communicating with said measuring chamber, and a return duct for the removal of overflow substance from said measuring chamber.

4. In an apparatus for dispensing measured quantities of substance of varying density, in combination, a measuring chamber provided with an outlet, a plunger for changing the effective volume of said measuring chamber, a piston for expelling the content of said measuring chamber, a return duct for the removal of overflow substance from said measuring chamber and a weighted adjustable control valve inserted in said return duct.

5. An apparatus for dispensing measured quantities of ice cream comprising a measuring chamber provided with a discharge nozzle, a discharging piston slidably arranged within said measuring chamber, a plunger for changing the effective volume of said measuring chamber, means for manually adjusting the position of said plunger, a receiving chamber intermittently communicating with the said measuring chamber, and an overflow duct connecting said receiving chamber with a supply tank.

6. An apparatus for dispensing measured quantities of ice cream comprising, in combination, a measuring chamber provided with a discharge nozzle, a discharging piston slidably arranged within the said measuring chamber, a plunger for changing the effective volume of said chamber, a receiving chamber connected with the said measuring chamber, means for intermittently connecting said two chambers, and an overflow duct connecting the said receiving chamber with the supply tank.

7. An apparatus for dispensing measured quantities of ice cream, comprising a measuring chamber provided with a discharge nozzle, a receiving chamber having an outlet port connecting with the said measuring chamber, a plunger for changing the effective volume of said measuring chamber, a reciprocating sleeve slidably arranged within said measuring chamber, the said reciprocating sleeve having an inlet port positioned for registration with said outlet port, of the receiving chamber, said sleeve being dimensioned as to cover the nozzle of the measuring chamber, its inlet port registering with the said outlet port, and an overflow duct connecting the receiving chamber with the supply tank.

KARL P. HERBOLD.

REFERENCES CITED

The following references are of record in the file of this patent:

UNITED STATES PATENTS

| Number | Name | Date |
| --- | --- | --- |
| 845,572 | Peck | Feb. 26, 1907 |
| 849,735 | Henlings | Apr. 9, 1907 |
| 2,004,161 | Rausel | June 11, 1935 |
| 2,229,476 | Reichle | Jan. 21, 1941 |